United States Patent
Curro et al.

(10) Patent No.: US 9,440,394 B2
(45) Date of Patent: *Sep. 13, 2016

(54) METHODS OF MECHANICALLY DEFORMING MATERIALS

(75) Inventors: John Joseph Curro, Cincinnati, OH (US); Jill Marlene Orr, Liberty Township, OH (US); John Brian Strube, Okeana, OH (US); Leroy Joseph Kocher, Sunman, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 1030 days.

This patent is subject to a terminal disclaimer.

(21) Appl. No.: 13/455,698

(22) Filed: Apr. 25, 2012

(65) Prior Publication Data

US 2012/0277393 A1    Nov. 1, 2012

Related U.S. Application Data

(63) Continuation-in-part of application No. 13/094,195, filed on Apr. 26, 2011, now Pat. No. 8,657,596, and a continuation-in-part of application No. 13/094,295, filed on Apr. 26, 2011.

(51) Int. Cl.
    *B29C 59/04* (2006.01)
    *B31F 1/07* (2006.01)
    *B29C 55/18* (2006.01)

(52) U.S. Cl.
    CPC ............. *B29C 55/18* (2013.01); *B31F 1/07* (2013.01); *B29C 59/04* (2013.01); *B31F 2201/0733* (2013.01); *B31F 2201/0738* (2013.01); *B31F 2201/0741* (2013.01); *B31F 2201/0774* (2013.01); *B31F 2201/0797* (2013.01)

(58) Field of Classification Search
    CPC .............. B31F 2201/0797; B31F 2201/0779; B31F 2201/0738; B31F 2201/0733; B29C 55/18; B29C 2059/029; B29C 59/04; B29C 2043/463
    USPC .............. 162/361, 362, 114, 286; 264/173.1, 264/175, 156
    See application file for complete search history.

(56) References Cited

U.S. PATENT DOCUMENTS

| | | |
|---|---|---|
| 3,017,304 A | 1/1962 | Burgeni |
| 3,496,259 A | 2/1970 | Guenther |
| 3,509,007 A | 4/1970 | Kalwaites |
| 3,994,771 A | 11/1976 | Morgan, Jr. et al. |

(Continued)

FOREIGN PATENT DOCUMENTS

| | | |
|---|---|---|
| EP | 0598970 B2 | 6/1994 |
| EP | 0959164 | 11/1999 |

(Continued)

OTHER PUBLICATIONS

U.S. Appl. No. 13/094,477, filed Apr. 26, 2011, Keith Joseph Stone et al.

(Continued)

*Primary Examiner* — Jeffrey Wollschlager
*Assistant Examiner* — Armand Melendez
(74) *Attorney, Agent, or Firm* — Jeffrey V Bamber

(57) ABSTRACT

Methods of mechanically deforming a material are disclosed. The methods of mechanically deforming a material involve using forming members that are moving at different surface speeds relative to each other to form deformed web materials.

2 Claims, 9 Drawing Sheets

(56) References Cited

U.S. PATENT DOCUMENTS

| | | | |
|---|---|---|---|
| 4,189,344 A | 2/1980 | Busker | |
| 4,300,981 A | 11/1981 | Carstens | |
| 4,992,324 A | 2/1991 | Dube | |
| 5,143,679 A | 9/1992 | Weber | |
| 5,242,435 A | 9/1993 | Murji | |
| 5,704,101 A | 9/1993 | Murji et al | |
| 5,387,385 A | 2/1995 | Murji et al. | |
| 5,518,801 A | 5/1996 | Chappell et al. | |
| 5,562,645 A | 10/1996 | Tanzer et al. | |
| 5,634,915 A | 6/1997 | Osterhahl | |
| 5,691,035 A | 11/1997 | Chappell et al. | |
| 5,723,087 A | 3/1998 | Chappell et al. | |
| 5,743,999 A | 4/1998 | Kamps | |
| 5,891,544 A | 4/1999 | Chappell et al. | |
| 5,916,507 A | 6/1999 | Dabi et al. | |
| 5,916,663 A | 6/1999 | Chappell et al. | |
| 6,007,468 A | 12/1999 | Giacometti | |
| 6,027,483 A | 2/2000 | Chappell et al. | |
| 6,053,232 A | 4/2000 | Biagotti | |
| 6,074,524 A | 6/2000 | Wu et al. | |
| 6,264,872 B1* | 7/2001 | Majors et al. | 264/284 |
| 6,296,737 B1 | 10/2001 | Wu et al. | |
| 6,344,109 B1 | 2/2002 | Gross | |
| 6,344,111 B1 | 2/2002 | Wilhelm | |
| 6,355,200 B1 | 3/2002 | Schmidt et al. | |
| 6,458,447 B1 | 10/2002 | Cabell et al. | |
| 6,533,898 B2 | 3/2003 | Gross | |
| 6,642,432 B1 | 11/2003 | Matsui et al. | |
| 7,112,257 B2 | 9/2006 | Baggot et al. | |
| 7,497,926 B2 | 3/2009 | Hermans et al. | |
| 7,527,615 B2 | 5/2009 | Roe et al. | |
| 7,632,979 B2 | 12/2009 | Fujii et al. | |
| 8,021,591 B2 | 9/2011 | Curro et al. | |
| 2003/0121380 A1 | 7/2003 | Cowell et al. | |
| 2003/0204178 A1 | 10/2003 | Febo et al. | |
| 2005/0021753 A1 | 1/2005 | Coleman | |
| 2005/0064136 A1 | 3/2005 | Turner et al. | |
| 2005/0076936 A1 | 4/2005 | Allie et al. | |
| 2006/0087053 A1* | 4/2006 | O'Donnell et al. | 264/156 |
| 2006/0151914 A1 | 7/2006 | Gerndt | |
| 2006/0206072 A1 | 9/2006 | Malakouti et al. | |
| 2006/0286343 A1 | 12/2006 | Curro et al. | |
| 2008/0217809 A1 | 9/2008 | Zhao et al. | |
| 2008/0221538 A1 | 9/2008 | Zhao et al. | |
| 2008/0221539 A1 | 9/2008 | Zhao et al. | |
| 2008/0221541 A1 | 9/2008 | Lavash et al. | |
| 2008/0221542 A1 | 9/2008 | Zhao et al. | |
| 2010/0201024 A1 | 8/2010 | Gibson et al. | |
| 2010/0318047 A1 | 12/2010 | Ducker et al. | |
| 2012/0064280 A1 | 3/2012 | Hammons et al. | |
| 2012/0064298 A1 | 3/2012 | Orr et al. | |
| 2012/0273146 A1 | 11/2012 | Curro et al. | |
| 2012/0273148 A1* | 11/2012 | Orr et al. | 162/204 |
| 2012/0273997 A1 | 11/2012 | Stone et al. | |
| 2012/0276238 A1 | 11/2012 | Strube et al. | |
| 2012/0276239 A1 | 11/2012 | Coe et al. | |
| 2012/0276337 A1* | 11/2012 | Curro et al. | 428/156 |
| 2012/0276341 A1 | 11/2012 | Lake et al. | |
| 2012/0277393 A1 | 11/2012 | Curro et al. | |
| 2012/0277701 A1 | 11/2012 | Stone et al. | |
| 2012/0277704 A1 | 11/2012 | Marinelli et al. | |
| 2012/0277705 A1 | 11/2012 | Marinelli et al. | |
| 2012/0277706 A1 | 11/2012 | Marinelli et al. | |
| 2012/0277707 A1* | 11/2012 | Orr et al. | 604/374 |
| 2012/0277708 A1 | 11/2012 | Marinelli et al. | |
| 2012/0277709 A1 | 11/2012 | Marinelli et al. | |
| 2012/0277710 A1* | 11/2012 | Marinelli et al. | 604/374 |

FOREIGN PATENT DOCUMENTS

| | | |
|---|---|---|
| JP | 2011-137248 | 7/2011 |
| WO | WO2004 108037 | 12/2004 |
| WO | WO-2005/011936 A1 | 2/2005 |
| WO | WO-2007/001270 A1 | 1/2007 |
| WO | WO-2008/107846 A1 | 9/2008 |

OTHER PUBLICATIONS

U.S. Appl. No. 13/094,559, filed Apr. 26, 2011, Richard George Coe et al.

U.S. Appl. No. 13/094,593, filed Apr. 26, 2011, Keith Joseph Stone et al.

U.S. Appl. No. 13/094,185, filed Apr. 26, 2011, John Lee Hammons et al.

U.S. Appl. No. 13/094,195, filed Apr. 26, 2011, Kirk Wallace Lake et al.

U.S. Appl. No. 13/094,206, filed Apr. 26, 2011, Jill Marlene Orr et al.

U.S. Appl. No. 13/094,219, filed Apr. 26, 2011, John Brian Strube et al.

U.S. Appl. No. 13/094,265, filed Apr. 26, 2011, Luigi Marinelli et al.

U.S. Appl. No. 13/094,279, filed Apr. 26, 2011, Luigi Marinelli et al.

U.S. Appl. No. 13/094,295, filed Apr. 26, 2011, Luigi Marinelli et al.

U.S. Appl. No. 13/094,310, filed Apr. 26, 2011, Jill Marlene Orr et al.

U.S. Appl. No. 13/455,185, filed Apr. 25, 2012, Luigi Marinelli et al.

U.S. Appl. No. 13/455,190, filed Apr. 25, 2012, Luigi Marinelli et al.

U.S. Appl. No. 13/455,194, filed Apr. 25, 2012, Luigi Marinelli et al.

U.S. Appl. No. 13/455,199, filed Apr. 25, 2012, Jill Marlene Orr et al.

U.S. Appl. No. 13/455,508, filed Apr. 25, 2012, John Joseph Curro et al.

U.S. Appl. No. 13/455,532, filed Apr. 25, 2012, John Joseph Curro et al.

All Office Actions, U.S. Appl. No. 13/455,532.

International search report dated Aug. 10, 2012, 5 pages.

International search report dated Aug. 8, 2012, 5 pages.

International search report dated Aug. 10, 2012, 6 pages.

* cited by examiner

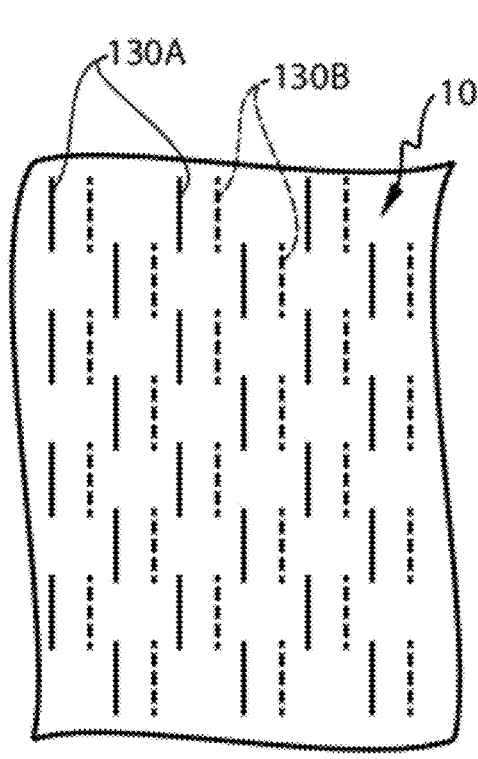
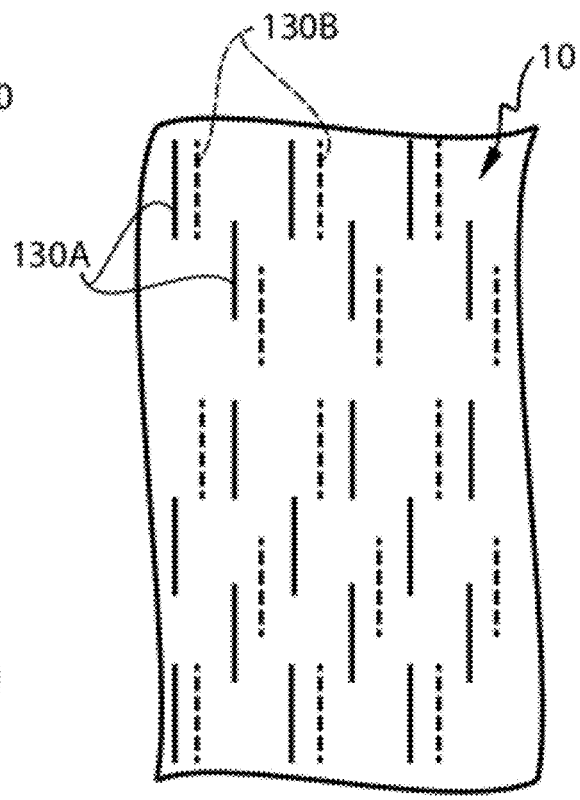
Fig. 11  Fig. 11A
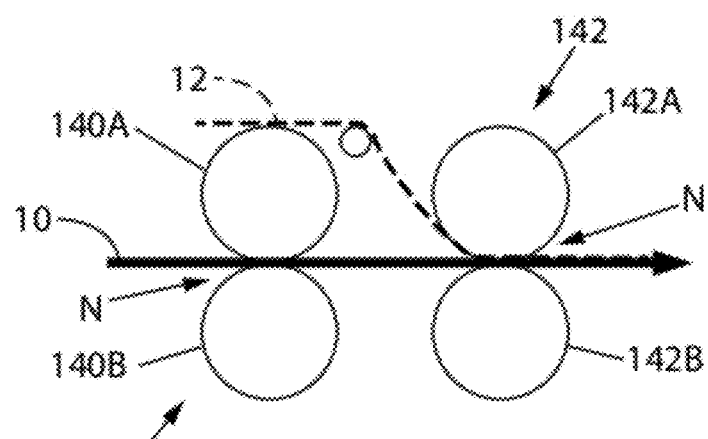
Fig. 12

METHODS OF MECHANICALLY DEFORMING MATERIALS

CROSS REFERENCE TO RELATED APPLICATIONS

This application is a continuation-in-part of U.S. patent application Ser. Nos. 13/094,195 and 13/094,295, both filed Apr. 26, 2011.

FIELD OF THE INVENTION

The present invention is directed to methods of mechanically deforming a material. More particularly, the present invention is directed to methods of mechanically deforming a material using forming members that are moving at different surface speeds to form deformed web materials.

BACKGROUND OF THE INVENTION

Various processes and apparatuses for mechanically deforming materials for different purposes are disclosed in the patent literature including: U.S. Pat. No. 3,496,259, Guenther; U.S. Pat. No. 3,509,007, Kalwaites; U.S. Pat. No. 6,007,468, Giacometti; U.S. Pat. No. 6,053,232, Biagotti; U.S. Pat. No. 7,112,257 B2, Baggot, et al.; and U.S. Pat. No. 7,497,926 B2, Hermans, et al. However, the search for improved and alternative processes for mechanically deforming materials has continued.

It is, therefore, desirable to provide improved methods of mechanically deforming materials to form deformed web materials.

SUMMARY OF THE INVENTION

The present invention is directed to methods of mechanically deforming a material, and more particularly, to methods of mechanically deforming a material using forming members that are intermeshing and moving at different surface speeds to form deformed web materials.

The methods of forming the deformed web materials involve subjecting a precursor web to at least one cycle (or pass) through a mechanical deformation process. The precursor material may be in roll or sheet form. The precursor material may comprise any suitable deformable material, including but not limited to: wovens, nonwovens, films, combinations, or laminates of any of the foregoing materials.

The methods involve passing the precursor web through a pair of intermeshing forming members comprising a first forming member and a second forming member that are moving at different surface speeds, wherein one of the first forming member and second forming member moves at a slower surface speed than the other. The forming members may include, but are not limited to plates, counter-rotating rolls, conveyor belts with pucks (or small plates), and/or belts with forming elements thereon. For example, the methods may involve subjecting the precursor web to at least one pass through the nip between counter-rotating rolls that are rotating at different surface speeds. The rolls comprise a first roll having a surface comprising a plurality of first forming elements; and a second roll having a surface comprising a plurality of second forming elements. When the precursor web is passed through the nip, at least one of the forming elements on the first forming member or the forming elements on the second forming member may push a portion of the precursor material out of the plane on at least one of the first and second surfaces of the precursor web material, or penetrate at least partially into the thickness of the precursor material.

The first forming elements and the second forming elements may comprise discrete or non-discrete male elements. In other versions of such embodiments, one of the first forming member and second forming member comprises discrete male forming elements, and the other of the first forming member and second forming member comprises non-discrete male elements.

Optionally, the methods may also involve subjecting the precursor web to multiple cycles (or passes) through an additional mechanical deformation process. The surface of the individual rolls in the additional deformation process may be provided with forming elements comprising protrusions or "male" elements.

The methods described herein may be used for a variety of purposes. Such purposes include, but are not limited to: forming a structure (such as an aperture, protrusion, or depression) in the precursor web; providing the materials with certain visual appearances; straining a web in multiple directions; and to aid in removing the web from a roll during a process of deforming a web. Such deformed web materials can be provided as components of products such as absorbent articles (such as topsheets, backsheets, acquisition layers, liquid handling layers, absorbent cores), packaging (such as flow wrap, shrink wrap, and polybags), trash bags, food wrap, wipes, facial tissue, toilet tissue, paper towels, and the like.

BRIEF DESCRIPTION OF THE DRAWINGS

The following detailed description will be more fully understood in view of the drawings in which:

FIG. 11 is a schematic plan view of an area on a web showing how the teeth on the two rolls could align in the nip.

FIG. 11A is a schematic plan view of an area on a web showing an alternative arrangement for how the teeth on the two rolls could align in the nip.

FIG. 12 is a schematic side view of one embodiment of an alternative apparatus for mechanically deforming materials.

Figure 1:
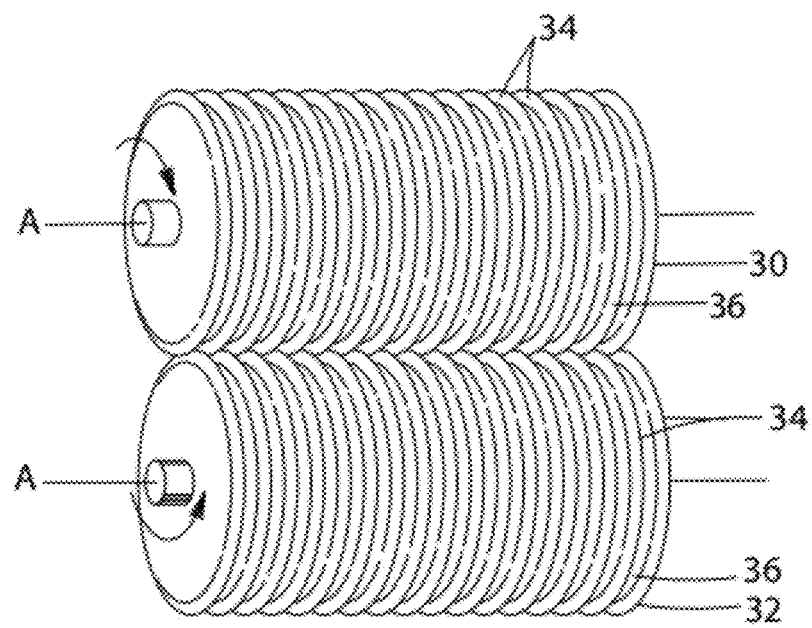
FIG. 1 is a perspective view of two intermeshing rolls that may be used to mechanically deform materials.

The embodiments of the absorbent structure and methods of making the same shown in the drawings are illustrative in nature and are not intended to be limiting of the invention defined by the claims. Moreover, the features of the invention will be more fully apparent and understood in view of the detailed description.

DETAILED DESCRIPTION

Definitions:

The term "absorbent article" includes disposable articles such as sanitary napkins, panty liners, tampons, interlabial devices, wound dressings, diapers, adult incontinence articles, wipes, and the like. Still further, the absorbent members produced by the methods and apparatuses disclosed herein can find utility in other webs such as scouring pads, dry-mop pads (such as SWIFFER® pads), and the like. At least some of such absorbent articles are intended for the absorption of body liquids, such as menses or blood, vaginal discharges, urine, and feces. Wipes may be used to absorb body liquids, or may be used for other purposes, such as for cleaning surfaces. Various absorbent articles described above will typically comprise a liquid pervious topsheet, a liquid impervious backsheet joined to the topsheet, and an absorbent core between the topsheet and backsheet.

The term "aperture", as used herein, refers to a hole. The apertures can either be punched cleanly through the web so that the material surrounding the aperture lies in the same plane as the web prior to the formation of the aperture (a "two dimensional" aperture), or holes formed in which at least some of the material surrounding the opening is pushed out of the plane of the web. In the latter case, the apertures may resemble a protrusion or depression with an aperture therein, and may be referred to herein as a "three dimensional" aperture, a subset of apertures.

The term "component" of an absorbent article, as used herein, refers to an individual constituent of an absorbent article, such as a topsheet, acquisition layer, liquid handling layer, absorbent core or layers of absorbent cores, backsheets, and barriers such as barrier layers and barrier cuffs.

The term "cross machine direction", "cross direction" (or abbreviation "CD") means the path that is perpendicular to the machine direction in the plane of the web.

The term "deformable material", as used herein, is a material which is capable of changing its shape or density in response to applied stresses or strains.

The term "discrete", as used herein, means distinct or unconnected. When the term "discrete" is used relative to forming elements on a forming member, it is meant that the distal (or radially outwardmost) ends of the forming elements are distinct or unconnected in all directions, including in the machine and cross-machine directions (even though bases of the forming elements may be formed into the same surface of a roll, for example). For example, the ridges on a ring roll are not considered to be discrete.

The term "disposable" is used herein to describe absorbent articles which are not intended to be laundered or otherwise restored or reused as an absorbent article (i.e., they are intended to be discarded after use and, preferably, to be recycled, composted or otherwise disposed of in an environmentally compatible manner).

The term "forming elements", as used herein, refers to any elements on the surface of a forming member that are capable of deforming a web. The term "forming elements" includes both continuous or non-discrete forming elements such as the ridges and grooves on ring rolls, and discrete forming elements. "Male" forming elements project from the surface of a forming member.

The term "joined to" encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined to" encompasses configurations in which an element is secured to another element at selected locations, as well as configurations in which an element is completely secured to another element across the entire surface of one of the elements.

The term "layer" is used herein to refer to an article whose primary dimension is X-Y, i.e., along its length and width. It should be understood that the term "layer" is not necessarily limited to single layers or sheets of material. Thus the layer can comprise laminates or combinations of several sheets or webs of the requisite type of materials. Accordingly, the term "layer" includes the terms "layers" and "layered".

The term "machine direction" (or abbreviation "MD") means the path that material, such as a web, follows through a manufacturing process.

The terms "mechanically impacting" or "mechanically deforming", may be used interchangeably herein, to refer to processes in which a mechanical force is exerted upon a material.

The term "Micro-SELF" is a process that is similar in apparatus and method to that of the SELF process defined herein. Micro-SELF teeth have different dimensions such that they are more conducive to forming tufts with openings on the leading and trailing ends. A process using micro-SELF to form tufts in a web substrate is disclosed in U.S. Patent application Publication No. US 2006/0286343A1. For the purposes of the present disclosure, Micro-SELF will be considered to be a subset of SELF technology.

The term "patterned", as used herein with reference to the forming members, includes forming members having discrete elements thereon, as well as those having continuous features thereon such as the ridges and grooves on a ring roll.

The term "permanently deformed", as used herein, refers to the state of a deformable material whose shape or density has been permanently altered in response to applied stresses or strains.

The term "region(s)" refer to portions or sections across the X-Y plane of the absorbent member.

The terms "ring roll" or "ring rolling" refer to a process using deformation members comprising counter rotating rolls, intermeshing belts or intermeshing plates containing continuous ridges and grooves where intermeshing ridges and grooves of deformation members engage and stretch a web interposed therebetween. For ring rolling, the deformation members can be arranged to stretch the web in the cross machine direction or the machine direction depending on the orientation of the teeth and grooves.

The term "rotary knife aperturing" (RKA) refers to a process and apparatus using intermeshing deformation members similar to that defined herein with respect to SELF or micro-SELF. The RKA process differs from SELF or micro-SELF in that the relatively flat, elongated teeth of a SELF or micro-SELF deformation member have been modified to be generally pointed at the distal end. Teeth can be sharpened to cut through as well as deform a web to produce an apertured web, or in some cases, a three-dimensionally apertured web, as disclosed in U.S. Patent Application Publication Nos. US 2005/0064136A1, US 2006/0087053A1, and US 2005/021753. RKA teeth can have other shapes and profiles and the RKA process can also be used to mechanically deform fibrous webs without aperturing the web. In other respects such as tooth height, tooth spacing, pitch, depth of engagement, and other processing parameters, RKA and the RKA apparatus can be the same as described herein with respect to SELF or micro-SELF.

The terms "SELF" or "SELF'ing", refer to Procter & Gamble technology in which SELF stands for Structural Elastic Like Film. While the process was originally developed for deforming polymer film to have beneficial structural characteristics, it has been found that the SELF'ing process can be used to produce beneficial structures in other materials, such as fibrous materials. Processes, apparatus, and patterns produced via SELF are illustrated and described in U.S. Pat. Nos. 5,518,801; 5,691,035; 5,723,087; 5,891,544; 5,916,663; 6,027,483; and, 7,527,615 B2.

The term "tuft", as used herein, refers to a particular type of protrusion that may be formed in a nonwoven web. Tufts typically have a tunnel-like configuration, and in some cases may be open at one or both of their ends.

I. Precursor Materials

The present invention is directed to methods of mechanically deforming a material. More particularly, the present invention is directed to methods of mechanically deforming a material using forming members that are intermeshing and moving at different surface speeds to form deformed web materials. The methods of interest herein are to be distinguished from carding processes, which involve combing of individual fibers which merely push the fibers, and are not structures that have integrity and can be mechanically deformed as described herein.

The deformed web materials are made from a "precursor material" that is in the form of a web or sheet. The precursor web material has a first surface and a second surface, each of which is generally planar (i.e., defines a plane). The precursor web material (or "precursor web") that will be deformed can comprise any suitable deformable material, such as a woven, nonwoven, film, combination, or laminate of any of the foregoing materials. As used herein, the term "nonwoven web" refers to a web having a structure of individual fibers or threads which are interlaid, but not in a repeating pattern as in a woven or knitted fabric (which do not typically have randomly oriented fibers). This may include paper substrates, such as tissue, drylap, liner board, filter paper, and combinations thereof. Nonwoven webs or fabrics have been formed from many processes, such as, for example, meltblowing, spunbonding, hydroentangling, airlaid, and bonded carded web processes, including carded thermal bonding.

The woven, nonwoven, film, combination, or laminate can be made of any suitable deformable materials including, but not limited to natural materials, synthetic materials, and combinations thereof. Suitable natural materials include, but are not limited to cellulose, cotton linters, bagasse, wool fibers, silk fibers, etc. Suitable materials may be elastic or include elastic strands. Suitable synthetic materials include, but are not limited to rayon and polymeric materials. Suitable polymeric materials include, but are not limited to: polyethylene, polyester, polyethylene terephthalate (PET), and polypropylene. Any of the materials described above may comprise sustainable or renewable materials and/or post-consumer recycled material. In some embodiments, the precursor material comprises at least some cellulosic material, which may be a paper grade material. In some cases, the precursor materials may consist of, or consist essentially of, one of the materials listed above. In some cases, the precursor materials may be substantially free of cellulose, and/or exclude paper materials, and/or exclude wet laid materials such as such: drylap, liner board, paper board, filter paper, and combinations thereof.

Various polymers can be included in the precursor materials. Potential materials include biopolymers made from non-petroleum sources such as bio-derived polyethylene (bio-PE), bio-derived polypropylene (bio-PP), bio-derived polyethylene terephthalate (bio-PET), and bio-derived poly (ethylene-2,5-furandicarboxylate) (bio-PEF). These materials can be partially or completely derived from at least one renewable resource where a renewable resource refers to a natural resource that can be replenished within a 100 year time frame. Renewable resources include plants, animals, fish, bacteria, fungi, and forestry products and may be naturally occurring, hybrids, or genetically engineered organisms. Natural resources such as crude oil, coal, and peat which take longer than 100 years to form are not considered to be renewable resources. Other polymers derived from non-petroleum sources include starch-based polymers and cellulosics. Additionally, recycled resins such as post-consumer regrind r-HDPE, r-LLDPE, r-LDPE, r-PET, r-PEF, or r-PP can be used at 100% or blended with various resins. Polymers derived from renewable resources and recycled resins could be used on their own, or blended into petroleum-based polymers at varying levels in order to control the cost. Sources and methods of making polymers from non-petroleum sources can be found in U.S. Pat. No. 8,063,064 B1 and U.S. Patent Application Publication US 2011/0319849 A1 which are incorporated herein by reference.

II. Methods for Deforming Materials

The methods of forming the deformed web materials involve subjecting the precursor web to at least one cycle or pass through a mechanical deformation process.

The mechanical deformation process can be carried out on any suitable apparatus that may comprise any suitable type(s) of forming members. Suitable types of forming apparatus include, but are not limited to: a pair of rolls that define a nip therebetween; pairs of plates; conveyors with pucks (or small plates) that define a nip therebetween; belts that define a nip therebetween; or combinations thereof. Examples of belts and rolls that could be modified for use in the present methods are described in U.S. Pat. No. 8,021, 591, Curro, et al. In the case of plates, at least one of the plates could move in the machine direction relative to the other plate as the plates come together to contact the precursor web in order to provide a similar motion to that of the rolls described herein. However, it is understood that the resultant structure produced by a pair of plates or belts could be different from that produced by rolls because of the reduced angles of engagement and disengagement present in a process comprising a pair of plates or belts. Although the apparatuses will be described herein for convenience primarily in terms of rolls, it should be understood that the description will be applicable to methods employing forming members that have any other configurations, in which case the other forming members may have forming elements in any of the configurations described below.

The rolls used in the apparatuses and methods described herein are typically generally cylindrical. The term "generally cylindrical", as used herein, encompasses rolls that are not only perfectly cylindrical, but also cylindrical rolls that may have elements on their surface. The term "generally cylindrical" also includes rolls that may have a step-down in diameter, such as on the surface of the roll near the ends of the roll, and rolls that are crowned. The rolls are also typically substantially non-deformable. The term "substantially non-deformable", as used herein, refers to rolls having surfaces (and any elements thereon) that typically do not deform or compress when used in carrying out the processes described herein. The rolls can be made from any suitable materials including, but not limited to steel or aluminum. The steel may be made of corrosion resistant and wear resistant steel, such as stainless steel. The rolls may or may not be heated. If heated, consideration of thermal expansion effects must be accommodated according to well known practices to one skilled in the art of thermo-mechanical processes.

The components of the forming apparatus (for instance, the rolls of a pair of rolls), such as those shown in FIG. 1, are provided with male forming elements thereon that can intermesh with one another. The rolls may have any suitable type of male forming elements on their surface. The surface of the individual rolls may, depending on the desired type of mechanical deformation, be provided with "continuous" male elements, such as the ridges on a ring roll, or "discrete" male elements, also referred to herein as teeth.

In all of the embodiments described herein, the rolls are non-contacting, and axially-driven. The terms "intermeshing" or "meshing", as used herein, refer to arrangements when the forming elements on one of the components of the forming structure (e.g., roll) extend toward the surface of the other forming structure and the forming elements have portions that extend between and below an imaginary plane drawn though the tips of the forming elements on the surface of the other forming structure. The top portions or tips of the forming elements on the different forming members are, thus, offset relative to each other in the nip, such that they do not align or overlap within a nip.

The rolls in the pair of rolls (or other rotating forming members) will typically both rotate in opposite directions (that is, the rolls are counter-rotating). The rolls in at least one pair of rolls may rotate at different surface speeds. The rolls may rotate at different surface speeds by rotating the rolls at different axial speeds, by using rolls that have different diameters that rotate at the same axial speeds, or a combination of the two. The rolls may rotate at substantially the same speed as the speed at which the web is fed through the nip between the rolls; or, they may rotate at a greater or lesser speed than the speed at which the web is fed through the nip between the rolls. In cases where the rolls rotate at different speeds, there can be any suitable difference in surface or peripheral speeds between the rolls. The surface speed ratio between the rolls may be anywhere from greater than about 1.01 up to about 3.0, alternatively, between about 1.02 and about 3.0.

FIG. 1 shows an embodiment in which the rolls 30 and 32 are referred to herein as "ring rolls". The rolls 30 and 32, as in the case of the rolls in the other apparatuses shown and described herein, are carried on respective rotatable shafts having their axes A of rotation disposed in a parallel relationship. In this embodiment, the surfaces of the rolls have a plurality of alternating ridges 34 and grooves 36 extending around the circumference of the rolls. In other embodiments, the ridges and grooves may extend parallel to the axes A of the rolls. One or more of such rolls can be used in the various embodiments of the apparatuses described herein.

Figure 2:
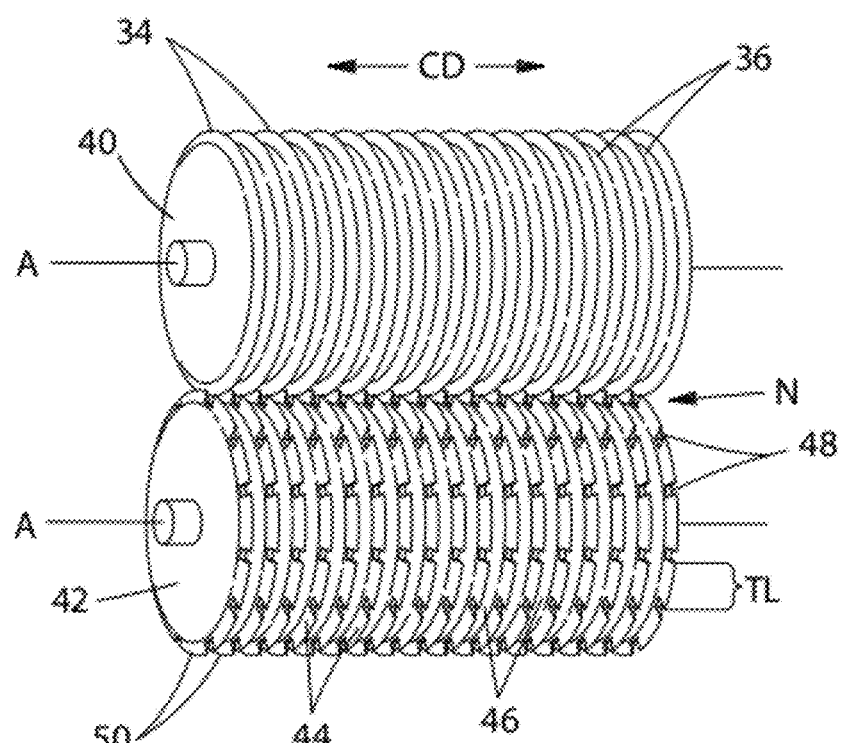
FIG. 2 is a perspective view of two intermeshing rolls in another apparatus that may be used to mechanically deform materials.

FIG. 2 shows another embodiment in which one of the rolls 40 is a ring roll having alternating ridges 34 and grooves 36 extending around its circumference, and the other roll 42 comprises one of The Procter & Gamble Company's SELF technology rolls. The components of the forming apparatus (for instance, the rolls of a pair of rolls) such as those shown in FIG. 2, may comprise at least one roll, such as roll 42, that comprises discrete "male" forming elements thereon that can intermesh with the surface of the opposing roll. As shown in FIG. 2, the male elements on each roll may be arranged in rows so that they can be intermeshed and do not have to be phased in the machine direction (MD) as the rolls rotate.

The discrete male forming elements on the rolls may have any suitable configuration. A given forming element can have the same plan view length and width dimensions (such as a forming element with a circular or square shaped plan view). Alternatively, the forming element may have a length that is greater than its width (such as a forming element with a rectangular plan view), in which case, the forming element may have any suitable aspect ratio of its length to its width. Suitable configurations for the forming elements include, but are not limited to: teeth having a triangular-shaped side view; elements having columnar shapes; elements having plan view configurations including circular, oval, hour-glass shaped, star shaped, polygonal, and the like, and combinations thereof. Polygonal shapes include, but are not limited to rectangular, triangular, pentagonal, hexagonal, or trapezoidal. The side-walls of the forming elements may taper at a constant angle from the base to the tip, or they may change angles. The forming elements can have tips that are flat, rounded, or form a sharp point. Several examples of suitable configurations for the forming elements include, but are not limited to: SELF elements, RKA elements, shark fin, or pin shaped elements, and variations of the same. These are described in greater detail below with reference to FIGS. 2-10.

The forming elements on the SELF rolls can be oriented in either the machine direction (MD) or the cross-machine direction (CD) (depending on the configuration of the other roll, which must be configured so that the forming elements on the rolls do not contact each other). As shown in FIG. 2, the SELF rolls, such as roll 42, may comprise a plurality of alternating circumferential ridges 44 and grooves 46 around the circumference of the roll. The ridges 44 have spaced apart channels 48 formed therein that are oriented parallel to the axis of the roll. The channels 48 form breaks in the ridges 44 that create forming elements or teeth 50 on the SELF roll. In such embodiments, the teeth 50 have their longer dimension oriented in the machine direction (MD). These roll configurations will be referred to herein as a "CD SELF" roll, since in the usual SELF process, the material being fed into a nip formed by such a roll would be stretched in the cross-machine direction (or "CD"). It should be understood that the process used herein differs from Procter & Gamble's SELF process in that the rolls operate at a speed differential and produces structures with different properties than those produced in the typical SELF process.

Figure 3:
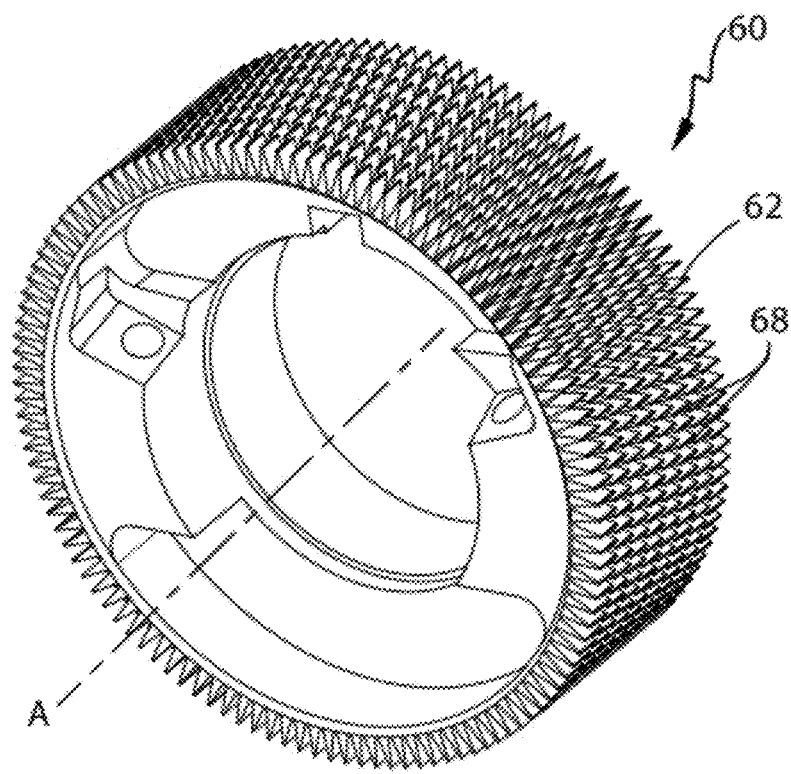
FIG. 3 is a perspective view of another embodiment of a roll that can be used in the methods described herein.

In other embodiments (such as shown in FIG. 3), the SELF roll 60 can comprise a machine direction, or "MD SELF" roll. Such a roll will have alternating ridges and grooves that have their longer dimension oriented parallel to the axis A of the roll (that is, in the cross-machine direction (CD)). The ridges in such a roll have spaced apart channels 68 formed therein that are oriented around the circumference of the roll. The channels 68 form breaks in the ridges to form forming elements or teeth 62 on the MD SELF roll. The particular MD SELF roll shown in FIG. 3 is referred to as a "staggered" MD SELF roll since the teeth are arranged in a staggered pattern. That is, the teeth in adjacent rows are offset, or staggered relative to each other. Such a roll could, for example, be mated to a similar roll; or, to a ring roll having ridges and grooves extending parallel to the axis of the roll.

Figure 4:
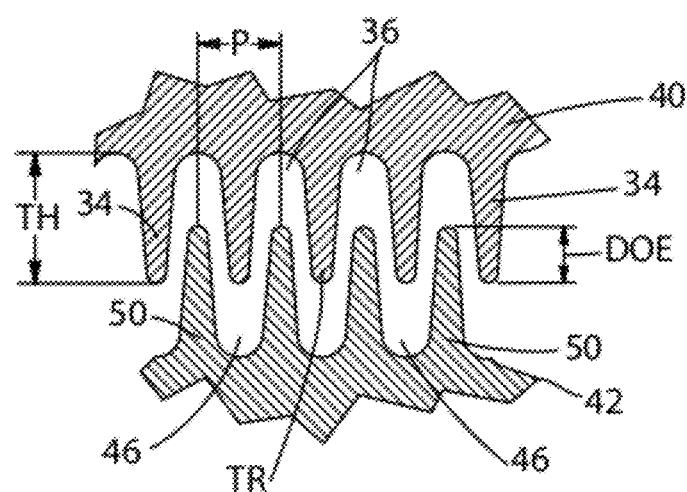
FIG. 4 is a cross-section of a portion of the intermeshing rolls.
Figure 5:
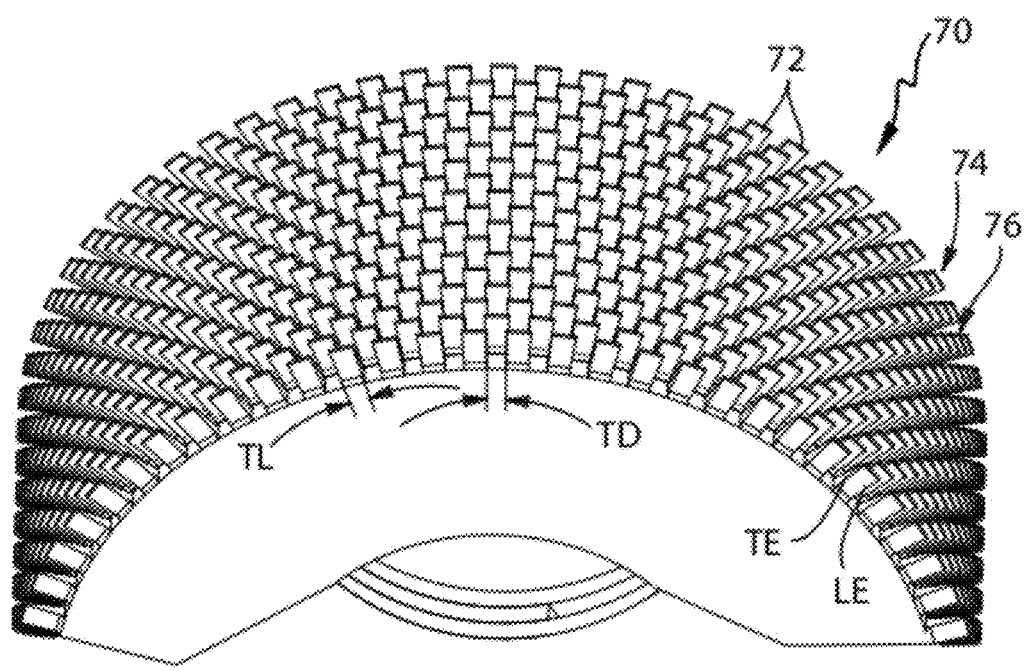
FIG. 5 is a perspective view showing a portion of another embodiment of a roll that can be used in the methods described herein.

FIG. 4 shows in cross section a portion of the intermeshing rolls 40 and 42 such as from the apparatus shown in FIG. 2. FIG. 4 shows the ridges 34 and grooves 36 between the ridges of the upper ring roll. The surface of the lower SELF roll has teeth 50 and grooves 46 between the teeth 50. The respective ridges 34 and teeth 50 can have a triangular or inverted V-shape when viewed in cross-section. The vertices of ridges and teeth are outermost with respect to the surface of the rolls. As shown, the forming elements have a ridge height (or, if the forming element are teeth, a tooth height) TH, a tip radius TR, a CD tooth-to-tooth spacing (or ridge-to-ridge spacing) referred to as the pitch P, and as shown in FIG. 5, a leading edge LE, a trailing edge TE, a tooth length TL, and a MD tooth-to-tooth spacing TD. The tooth length TL in such embodiments is a circumferential measurement. The outermost tips of the ridges or teeth have sides that are preferably rounded to avoid cuts or tears in the precursor material. As shown in FIG. 4, the forming elements, such as ridges 34 of one roll extend partially into the grooves 46 of the opposed roll to define a "depth of engagement" (DOE), which is a measure of the level of intermeshing of rolls 40 and 42.

In one embodiment, the teeth 50 may have a length TL ranging from about 0.5 mm (0.020 inch), or less, to about 10 mm (0.400 inch) and a MD spacing TD from about 0.5 mm (0.020 inch) to about 20 mm (0.800 inch), a tooth height TH ranging from about 0.5 mm (0.020 inch) to about 10 mm (0.400 inch), a tooth tip radius TR ranging from about 0.05 mm (0.002 inch) to about 2.0 mm (0.080 inch), and a pitch P between about 0.3 mm (0.012 inches) and 10 mm (0.400 inches). The depth of engagement DOE can be from about 0.02 mm (0.001 inch) to about 10 mm (0.400 inch) (up to a maximum approaching the tooth height TH). Of course, DOE, P, TH, TD, TL, and TR can each be varied independently of each other depending on the properties of precursor web 10 and the desired characteristics of the absorbent member 20. In addition, the shape and geometry of the teeth on the first roll can be the same or different from the shape and geometry of the teeth on the second mating roll.

FIG. 5 shows an embodiment of a roll that will be referred to herein as a "staggered CD SELF" roll. As shown in FIG. 5, the surface of the roll has a plurality of spaced apart teeth 72. The teeth 72 are arranged in a staggered pattern. More specifically, the teeth 72 are arranged in a plurality of circumferentially-extending, axially-spaced rows, such as 74 and 76, around the roll. Again, but for the spacing TD between the teeth in each row, the teeth in each roll would form a plurality of circumferentially-extending, axially-spaced alternating ridges and grooved regions. However, in this case, the teeth in adjacent rows are offset, or staggered, relative to each other. The tooth length TL and machine direction (MD) spacing TD can be defined such that the teeth in adjacent rows 74 and 76 either overlap or do not appear to overlap when the rolls are viewed from one of their ends. In the embodiment shown, the teeth 72 in adjacent rows are circumferentially offset by a distance of 0.5x (where "x" is equal to the tooth length plus the MD spacing TD between teeth in a given row). In other words, the leading edges LE of adjacent teeth in adjacent rows will be offset in the MD by 0.5x. The roll shown in FIG. 5 can be made in any suitable manner, such as by first cutting the ridges and grooves into the roll, then helically cutting the teeth 72 into the surface of the rolls with each cut being continuous. If desired, the tooth profile (in particular, the leading and trailing edges) can be modified by using a plunge cut.

Figure 6:
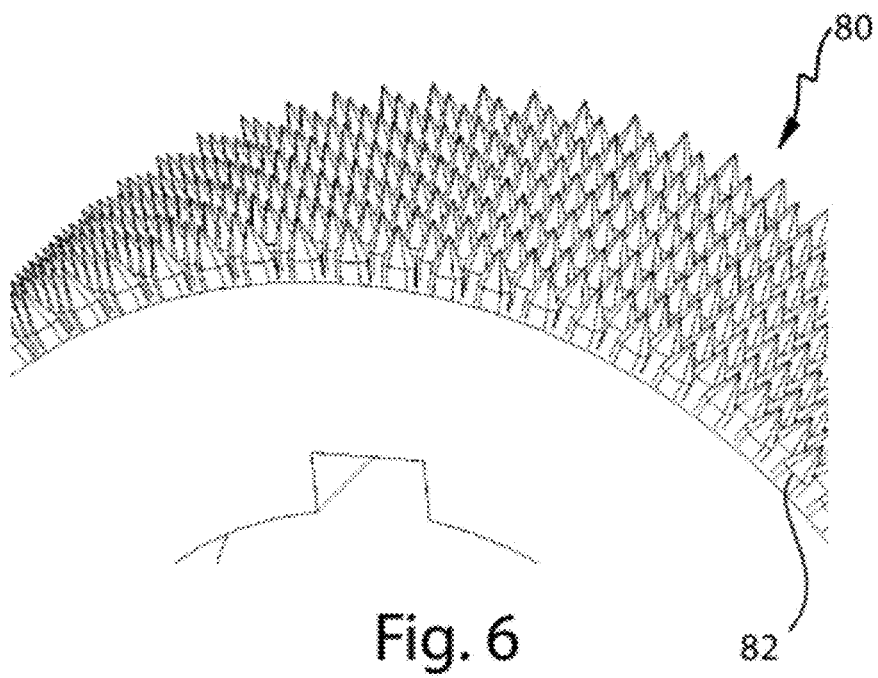
FIG. 6 is a perspective view showing a portion of another embodiment of a roll that can be used in the methods described herein.

FIG. 6 shows a portion of the surface of a roll having male elements of another configuration that can be used in the method. The roll shown in FIG. 6 is referred to herein as a Rotary Knife Aperturing (or "RKA") roll. As shown in FIG. 6, the roll 80 comprises circumferentially-extending alternating rows of teeth 82 and grooves. The teeth 82 have a pyramidal tooth shape and can have up to six sides, each side being generally triangular in shape. The teeth 82 are joined to the bottom roll at their bases. The bases of the teeth have a cross-sectional length dimension greater than a cross-sectional width dimension. The teeth 82 can taper at a constant angle from their base to their tip, or the angle of taper can change, as in the tooth shown in FIG. 6. FIG. 6 shows an example of teeth that are truncated at the base such that a portion of the sides of the teeth adjacent the base is substantially vertical before the teeth begin to taper toward their tips. RKA rolls are described in greater detail in U.S. Patent Application Publication No. US 2006/0087053 A1.

Figure 7:
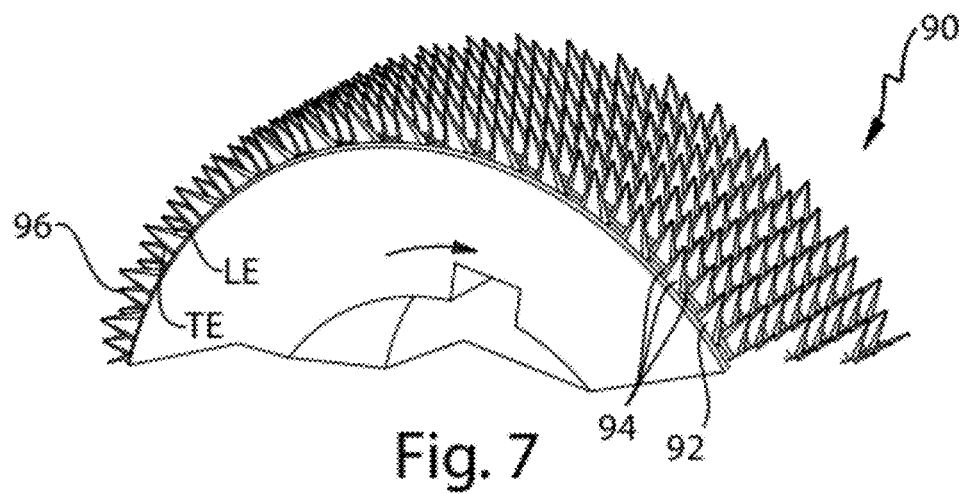
FIG. 7 is a perspective view showing a portion of another embodiment of a roll that can be used in the methods described herein.

FIG. 7 shows a portion of the surface of a roll 90 having male elements 92 of another configuration that can be used in the method. In this embodiment, the leading edge LE and trailing edge TE form different angles with the surface of the roll, and resemble the shape of a shark's fin (which may be referred to as a "shark fin tooth"). The leading edge LE may form a greater angle with the surface of the roll than the trailing edge TE. In some cases, the trailing edge TE may form an angle that is generally perpendicular to the surface of the roll. In the version of the shark fin tooth shown in FIG. 7, the shark fin tooth 92 has a generally pointed pyramidal shape with six sides 94 (three of which are shown on the half of the tooth depicted), where each side is generally triangular in shape. The vertex of two sides makes up the leading edge LE and the vertex of two sides makes up the trailing edge TE of tooth 92. The vertices of the leading or trailing edge can be relatively sharp, or in other cases, they can be machined to have a rounded radius of curvature. As shown in FIG. 7, the teeth can taper at a constant angle from their base to their tip, or the angle can change. The teeth can also have less than six sides, for example, if the LE and TE are squared off instead of forming a vertex.

Figure 8:
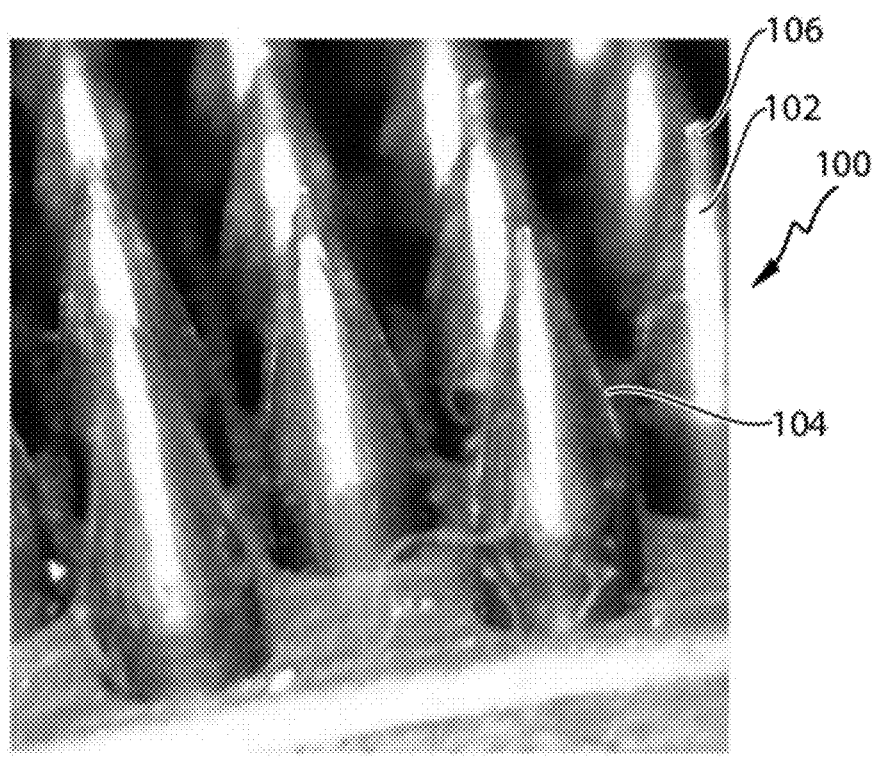
FIG. 8 is a magnified photograph showing a portion of the surface of another embodiment of a roll that can be used in the methods described herein.

FIG. 8 shows a portion of the surface of a roll 100 having male elements 102 of another configuration that can be used in the method. The roll 100 shown in FIG. 8 is referred to herein as a "pin" roll. Unlike the previous tooth geometries described, the teeth 102 of a pin roll are not faceted, meaning they do not comprise flat faces. The pin tooth can have various cross-sectional shapes, such as round or oval. The tip 106 of the tooth can come to a sharp point, be rounded or be truncated so it has a flat surface. The tooth 102 can also be bent at an angle. The side wall 104 can taper from the base to tip 106 at a constant angle, or the side wall can change angles. For example, the top of the tooth 102 can have a cone-like shape with a 30 degree angle between the axis of the tooth and the side wall 104, and the base of the tooth can have a cylindrical shape with a vertical side wall that runs parallel to the axis of the tooth.

Figure 9:
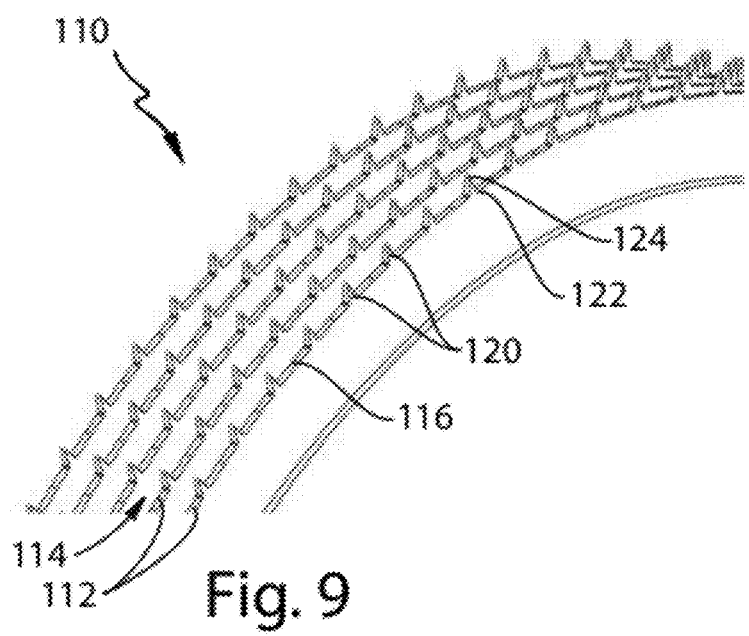
FIG. 9 is a perspective view showing a portion of another embodiment of a roll that can be used in the methods described herein.

FIG. 9 shows a portion of the surface of a roll 110 having male elements of another configuration that can be used in the method. The roll shown in FIG. 9 is referred to herein as a "raised ridge RKA" roll. As shown in FIG. 9, this roll 110 comprises a plurality of circumferentially extending ridges 112 and grooves 114 on its surface that are oriented perpendicular to the axis of the roll. The ridges 112 have a top surface 116 and the grooves 114 have a bottom surface. The roll 110 further comprises a plurality of spaced apart teeth 120 extending outwardly from the top surface 116 of the ridges 112. The teeth 120 have a base 122 and a tip 124, and the top surface 116 of the ridges 112 are disposed between the tips 124 of the teeth 120 and the bottom surface of the grooves directionally relative to the axis of the roll. In the version shown, the base 122 of the teeth 120 have a cross-sectional length dimension greater than a cross-sectional width dimension.

Figure 10:
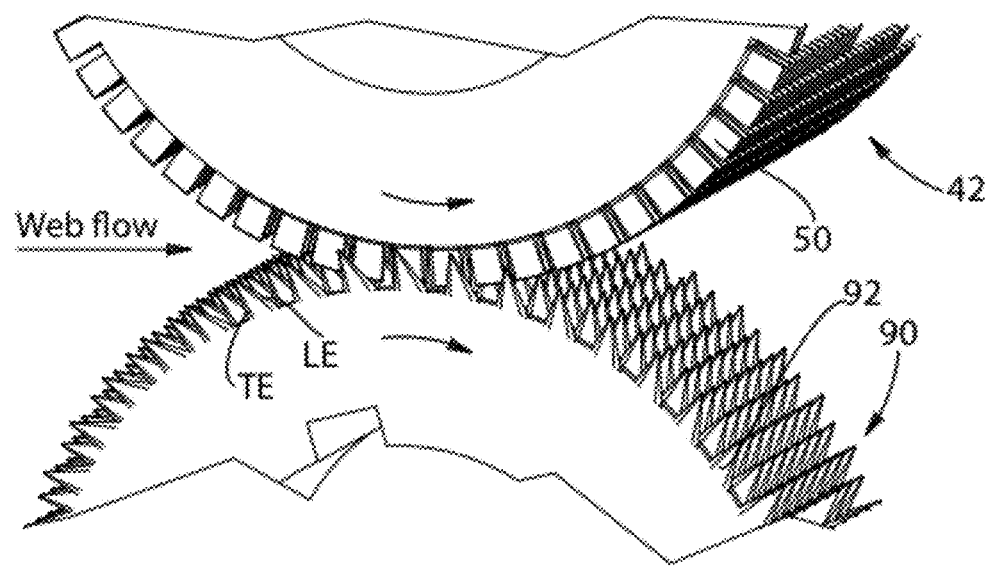
FIG. 10 is a perspective view of portions of an alternative embodiment of two intermeshing rolls that may be used to mechanically deform materials.

The rolls having the various configurations described herein can be mated together in any suitable combinations to form a nip therebetween. As shown in FIG. 2, the rolls comprising discrete male forming elements may be mated to a ring roll. Alternatively, as shown in FIG. 10, the rolls comprising discrete male forming elements may be mated to another roll comprising discrete male forming elements. A roll can be intermeshed with another roll comprising the same or different pattern, but must be done in a way such that the teeth do not come in contact with each other. The two mating rolls can be aligned such that the rows of teeth on the first roll are offset (or placed in between) in the CD from the rows of teeth on the second roll. The two mating rolls can also be aligned such that the rows of teeth on the first roll are aligned in the CD with the rows of teeth on the second roll, and the rolls are phased in the MD such that they do not come in contact with each other.

For some combinations of rolls, various processing aides are necessary to remove the web from one or both of the rolls after the web passes through the nip. For example, non-stick treatments, such as silicone or fluorocarbon treatments can be added. Other methods of aiding the removal of the web from the roller include air knives or brushing. In one embodiment, at least one of the rollers can have an internal chamber and means to provide positive air pressure at the point of web removal. In still other embodiments, the apparatus can be provided with a web removal system in the form of a comb or wrapped wires that can penetrate into the grooves of the roll and actively lift the web out of the grooves.

FIG. 10 shows one non-limiting embodiment of a suitable roll combination. FIG. 10 shows a mating roll combination formed by a CD SELF roll (shown on top) and a shark fin roll on bottom. Of course, in other embodiments, the positions of the two rolls could be reversed. The shark fin roll has been found to help reduce the force to remove the web from the roll and eliminate the need for a web removal aide on that roll. It is believed that the same would be the case for any tooth shape with a leading edge that is angled to be greater than 90 degrees from the surface of the roll. The angle referred to is measured between the portion of the surface of the roll outside the tooth to the leading edge. Typically, one roll speed will be close to that of the web and the mating roll speed will be slower than that of the web. For a shark fin roll mated to a SELF roll (or other type of roll), the shark fin roll will typically be the faster rotating roll. The surface speed ratio of the two rolls can be any suitable amount greater than or equal to 1.01, 1.05, 1.1, 1.5, 2.0, or 3.0, up to a maximum in which the web starts to contain undesired, large slits or continuous slits.

Various suitable roll combinations include, but are not limited to the following mating roll configurations: ring roll/ring roll, SELF/SELF, SELF/ring roll, RKA/shark fin, RKA/ring roll, SELF/shark fin (FIG. 10), shark fin/shark fin, SELF/pin, pin/shark fin, pin/ring roll, and pin/pin.

For embodiments that comprise two rolls with discrete male elements or teeth on both rolls, the process can be designed such that the teeth in the nip on the first roll can be phased with the teeth in the nip on the second roll. As a result, the teeth in the nip on the first roll may always have the same relative position to the teeth in the nip on the second mating roll, resulting in a consistent, repeating pattern of deformations on the web (even though the rolls are rotating at different speeds). FIG. 11 is a schematic plan view of an area on a web 10 showing an example of how the teeth on the two mating rolls (in this case two staggered CD SELF rolls) could align in the nip to create a consistent, repeating pattern on the web. FIG. 11 shows the areas 130A impacted on a web by teeth on a first roll and areas 130B impacted by the teeth on a second roll. Each of the deformations from the first roll is always at the same relative position to the adjacent deformations made by the second roll. The term "adjacent", as used in this context, refers to the closest deformation made by the other roll, even though the deformation may be formed into the opposite surface of the web. The process can be designed multiple ways to achieve this, including the following.

In one embodiment, the two mating roll diameters can be the same, and the rolls can be run at different axial speeds or revolutions per minute (rpms), and the MD tooth repeat length on at least one roll can be varied such that the ratio of the rpm of the first roll to the second roll is equal to the ratio of the MD tooth repeat length of the first roll to the second roll. The term "MD tooth repeat length" as used herein refers to the sum of the tooth length TL and the MD tooth-to-tooth spacing TD between the teeth.

In another embodiment, the rolls can be run at the same axial speed or rpm, and the roll diameter and MD tooth repeat length can be varied such that the ratio of the diameter of the first roll to the second roll is equal to the ratio of the MD tooth repeat length of the first roll to the second roll.

Alternatively, the process can be designed such that the teeth in the nip on the first roll are not phased to the teeth in the nip on the second mating roll and, therefore, the teeth on the first roll will not maintain a consistent MD position from one row of teeth to the next relative to the teeth on the second roll. FIG. 11A is a schematic plan view of an area on a web 10 showing an example of how the teeth on the two mating rolls (two staggered CD SELF rolls) could create a varying pattern, but still repeating at some interval. FIG. 11A shows the areas 130A impacted on a web by teeth on the first roll and areas 130B impacted by the teeth on the second roll. What is meant by "varying" is that the deformations formed by the first roll are not always in the same relative position to the deformations formed by the second roll from one row of teeth to the next. However, the pattern does repeat. In the example shown in FIG. 11A, the pattern repeats every seventh row of teeth on the first roll and every fifth row of teeth on the second roll. The repeat length will depend on the surface speed ratio, diameter and MD tooth repeat length of the two mating rolls.

The surface or surfaces of the deformed material 20 formed by the above methods will have a plurality of deformations therein. The deformations can be in any suitable form, including portions of the precursor material that are pushed out of the plane on at least one of the first and second surfaces of the precursor web (which do not penetrate the web); depressions, protrusions, apertures, or combinations thereof. The term "depressions" refers to deformations that extend partially into the thickness of the web. Apertures pass completely through the thickness of the web. The depressions or apertures created on one side of the web may be visible on the opposite side of the web and appear as protrusions or apertures, respectively. The deformations can be continuous (such as if two ring rolls are used), discrete, or combinations thereof. The deformations can be arranged in any suitable pattern, including regular patterns or random patterns. The pattern of the deformations is a product of the process and apparatus used to deform the precursor material. In some cases, the depressions or apertures may be elongated in the machine direction and have a first end and a second end.

Figure 18:
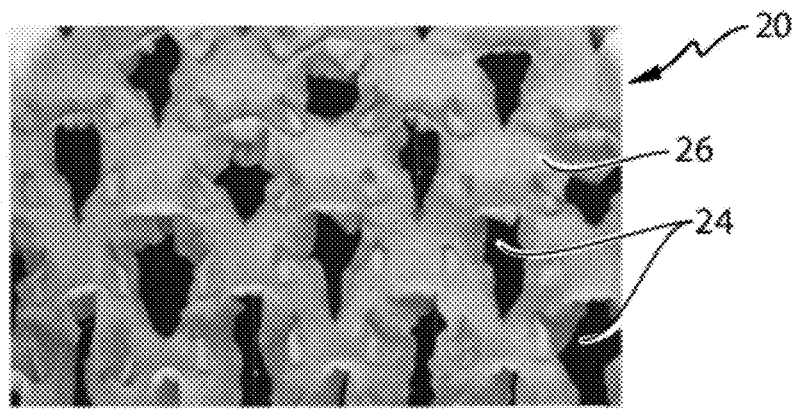
FIG. 18 is a photomicrograph of a comparative web to that shown in FIG. 17 that was mechanically deformed by intermeshing rolls operating at a speed differential.

In cases where the forming members comprise rolls having discrete forming elements (such as teeth) thereon, since the teeth on the roll that form the deformations or apertures are traveling at a different surface speed relative to the surface speed of the web, the teeth may "plow" the material such that deformations or apertures are elongated and enlarged in the MD, and in some cases, may also be enlarged in the CD. In addition, the "plowing" of the material also causes the material to be accumulated, and in many cases piled up, at one end of the depression or aperture such as shown in FIG. 18. These accumulated regions 26 may have a curvilinear plan view configuration that resembles the bow wave created by a boat traveling through water. This plowing effect may occur on one side or both sides of the web, depending upon the process used and the configuration of the forming member in the apparatus used to form the deformed web. Thus, in some cases, each surface of the deformed web may have a similar pattern of deformations therein. However, the accumulated regions formed on the first surface of such a deformed nonwoven web may, in some embodiments, be adjacent the first end portion of the depressions, and the accumulated regions formed on the second surface of the deformed web may be adjacent the second end portion of the depressions. The bow waves on opposite surfaces in such an embodiment will point in opposite directions.

III. Alternative Embodiments

There are numerous alternative embodiments of the methods described herein that can be used to provide the materials with various different properties.

In alternative embodiments, the method can comprise feeding a precursor web 10 through an apparatus with multiple deformation nips, such as that shown in FIG. 12. The apparatus shown in FIG. 12 comprises two pairs of rolls 140 and 142 and may be referred to as a "paired roll" apparatus. Each pair of rolls comprises two rolls, 140A and 140B, and 142A and 142B, respectively, that forms a single nip N therebetween. In the embodiment shown in FIG. 12, four rolls are shown. However, the apparatus can comprise any suitable number of rolls. Multiple rolls are useful when it is desirable to run the precursor web 10 through multiple nips. The apparatus can be configured to deform the web in the same location on the web, or in different locations.

In other alternative embodiments, the method can comprise deforming the web in one or more select regions across the surface.

In any of the embodiments described herein, the web can comprise one or more layers. In apparatuses that comprise multiple deformation nips such as shown in FIG. 12, additional webs such as web 12 may be introduced at any of the different nips. The additional layers may be used to add webs having different chemical compositions, formulations, aesthetics, conductive properties, aromatic properties, and mechanical properties. Such additional webs may be selected so that they may or may not span the entire width of the web or webs that were introduced upstream of such additional web(s). This may be used to create a laminate in which some regions of the laminate contain a different number of layers from other regions. In other laminate structures, the regions may contain the same number of layers, but some deformed features could have a different number of layers through their thickness.

EXAMPLES

The following Examples describe various films and nonwoven materials which are summarized in the table below. Examples 1, 3, 5, and 7 are comparative examples that are not made according to the methods of the present invention. Examples 2, 4, 6, and 8 are made according to the methods of the present invention.

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Web | PE Film | PE Film | PET Nonwoven | PET Nonwoven | PE Film | PE Film | PET Nonwoven | PET Nonwoven |
| Tooling | Micro-SELF mated to Ring Roll | Micro-SELF mated to Ring Roll | Micro-SELF mated to Ring Roll | Micro-SELF mated to Ring Roll | RKA mated to Raised Ridge RKA Roll | RKA mated to Raised Ridge RKA Roll | RKA mated to Raised Ridge RKA Roll | RKA mated to Raised Ridge RKA Roll |
| Surface Speed Ratio | 1.0 | 1.4 | 1.0 | 1.4 | 1.0 | 1.4 | 1.0 | 1.4 |
| Drawing Figure | 13 | 14 | 15 | 16 | 17 | 18 | 19 | 20 |

Examples 1-4 were processed at about 50 feet per minute (about 15 m/min.) using an apparatus comprising a staggered SELF roll, like that shown in FIG. 5, mated to a ring roll. The film in Examples 1 and 2 is a 25 grams/m$^2$ (gsm) polyethylene film. The nonwoven in Examples 3 and 4 is a 60 gsm spunbond polyester. The SELF roll and the ring roll are both 5.69 inches (14.4 cm) in diameter and have a CD pitch P of 0.060 inch (1.5 mm). The teeth on the SELF roll are arranged in a staggered pattern and are oriented such that the long direction runs in the MD. The teeth have a uniform circumferential length dimension TL of about 0.050 inch (1.3 mm) measured generally from the leading edge LE to the trailing edge TE, a tooth tip radius TR at the tooth tip of about 0.005 inch (0.13 mm), are uniformly spaced from one another circumferentially by a distance TD of about 0.060 inch (1.5 mm), and have a tooth height TH of about 0.145 inch (3.7 mm). The long sides of the teeth have an included angle of about 9.1 degrees (i.e., each side wall is angled at 4.55 degrees from vertical), and the leading and trailing edges of the teeth have vertical side walls. The ridges of the ring roll have a similar profile to the SELF teeth, with a ridge height TH of about 0.145 inch (3.7 mm), a tooth tip radius TR of about 0.005 inch (0.13 mm), and an included angle of about 9.1 degrees. The SELF roll and ring roll are offset relative to each other in the CD such that the clearances on either side of the teeth are about equal. The rolls are intermeshed to a depth of engagement (DOE) of 0.080 inch (2.0 mm). The ring roll is pre-wrapped 180 degrees and tension is applied to the web upstream of the nip to ensure the web does not slip on the ring roll. For Examples 1 and 3, the SELF roll and the ring roll are both run on a 22 tooth gear, resulting in a 1.0 surface speed ratio (i.e., equal surface speeds). For Examples 2 and 4, the SELF roll is run on a 16 tooth gear, while the ring roll is run on a 22 tooth gear, resulting in a 1.4 surface speed ratio with the SELF roll rotating faster than the ring roll.

The deformed webs produced by the processes in Examples 1-4 are shown in FIGS. 13-16, respectively.

Figure 13:
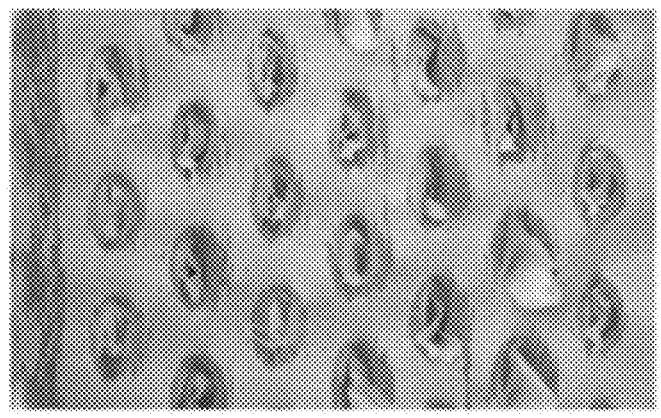
FIG. 13 is a photomicrograph of a comparative web that was mechanically deformed by intermeshing rolls operating at a matched speed.

FIG. 13 shows the comparative example material made by passing a film through the nip between two rolls moving at the same surface speed. As shown in FIG. 13, most of the stretch is localized in and around depressions created by the SELF teeth. In particular, most of stretch is orthogonal to plane of the web.

Figure 14:
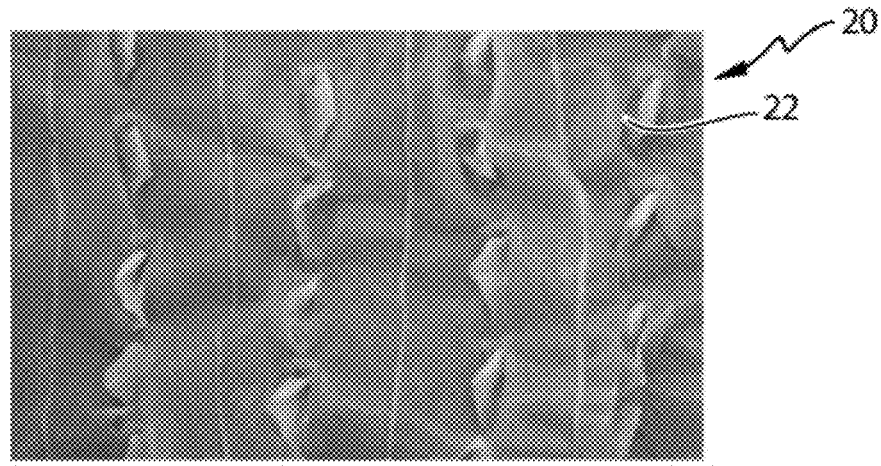
FIG. 14 is a photomicrograph of a comparative web to that shown in FIG. 13 that was mechanically deformed by intermeshing rolls operating at a speed differential.

This can be contrasted with the deformed web 20 formed by passing such a film through two rolls moving at different surface speeds according to the present invention. This latter film is shown in FIG. 14. As shown in FIG. 14, in this film, the stretched portions of the film extend further beyond the area of the depressions 22 and can permeate most of the web in some cases. Such a web will still be stretched in the region of the depressions 22 in a direction orthogonal to plane of web, but is also stretched in the MD and CD in the plane of the web. This example demonstrates the present invention has the ability to increase the dimensions of the web, and the locations of the web that are stretched. The method is, thus, able to provide stretch in multiple directions in a single nip.

Figure 15:
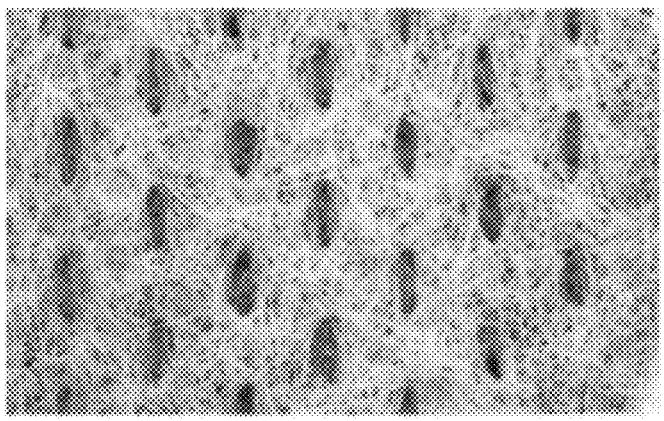
FIG. 15 is a photomicrograph of a comparative web that was mechanically deformed by intermeshing rolls operating at a matched speed.

FIG. 15 shows the comparative example material made by passing a nonwoven through the nip between two rolls moving at the same surface speed. As shown in FIG. 15, the web comprises depressions that are elongated in the machine direction.

Figure 16:
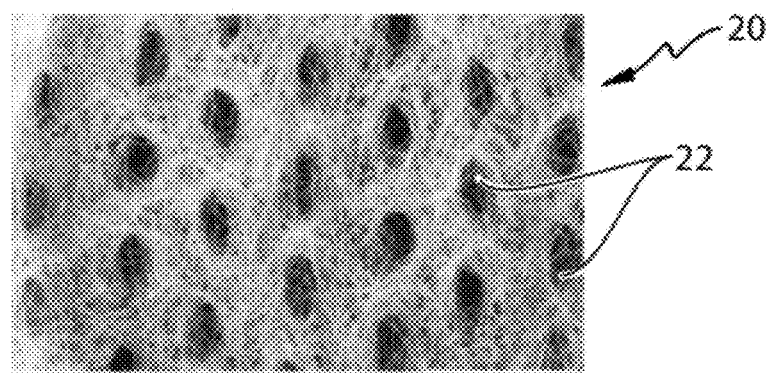
FIG. 16 is a photomicrograph of a comparative web to that shown in FIG. 15 that was mechanically deformed by intermeshing rolls operating at a speed differential.

This can be contrasted with the deformed web 20 formed by passing such a nonwoven through two rolls moving at different surface speeds according to the present invention. This latter nonwoven 20 is shown in FIG. 16. As shown in FIG. 16, the depressions 22 formed in the web are significantly wider in comparison to the web shown in FIG. 15. This is beneficial for improving fluid acquisition for absorbent structures and making the depressions more obvious to the consumer. The depressions 22 in the web in FIG. 16 also have a lower length-to-width aspect ratio in comparison to the web shown in FIG. 15.

Examples 5-8 were processed at about 50 feet per minute (about 15 m/min) using an apparatus comprising a staggered RKA roll, like that shown in FIG. 6, mated to a raised ridge RKA roll, like that shown in FIG. 9. The film in Examples 5 and 6 is a 25 gsm polyethylene film. The nonwoven in Examples 7 and 8 is a 60 gsm spunbond polyester. The RKA roll and the raised ridge RKA roll are both 5.69 inches (14.4 cm) in diameter and have a CD pitch P of 0.060 inch (1.5 mm). The teeth on the RKA roll are arranged in a staggered pattern and are oriented so the long direction runs in the MD. The teeth have a uniform tip to tip spacing in the MD of 0.170 inch (4.3 mm). The base of the RKA tooth is shaped like a hexagon and has a tooth height TH of 0.210 inch (5.3 mm). The two side walls of the tooth have a 13.6 degree included angle (i.e. each side wall is angled 6.8 degrees from vertical). The tooth has a pointed tip and the side walls of the tooth taper at a constant angle from the tooth tip to the base of the tooth. The leading edge LE and trailing edge TE of the tooth have a 50 degree included angle (i.e., each edge is angled 25 degrees from vertical). The walls that form the vertices that create the leading and trailing edges of the tooth taper at a constant angle from the tooth tip to a point on the tooth that is 0.150 inch (3.8 mm) below the tooth tip. Then, the walls change their angle to be vertical (i.e., at a 90 degree angle relative to the base of the roll) for the bottom 0.060" (1.5 mm) of the tooth. The raised ridge RKA roll has discrete forming elements that are also oriented so the long direction runs in the MD. The teeth are arranged in a standard pattern, meaning adjacent teeth align in rows in the CD. The teeth on the RKA roll have a pyramidal shape with four sides that taper from the ridge to a blunted tip with a 0.005" (0.13 mm) diameter. The tooth height TH is 0.040 inch (1.0 mm) and the ridge height is 0.105 inch (2.7 mm). The side walls of the tooth have an included angle of about 9.1 degrees (i.e., each side wall is angled about 4.55 degrees from vertical) and the leading and trailing edges of the teeth have an included angle of about 27.1 degrees. The teeth on the raised ridge RKA roll are evenly spaced in the MD, with a tip to tip spacing of 0.060 inch (1.5 mm). The RKA roll and raised ridge RKA roll are offset relative to each other in the CD such that the clearances on either side of the teeth are about equal. The position of the teeth on the RKA roll and raised ridge RKA roll are not positioned in any specific manner in the MD. The rolls are intermeshed to a DOE of 0.080 inch (2.0 mm). For Examples 5 and 7, the RKA roll and the raised ridge RKA roll are both run on a 22 tooth gear, resulting in a 1.0 surface speed ratio (i.e., equal surface speeds). For Examples 6 and 8, the RKA roll is run on a 16 tooth gear, while the raised ridge RKA roll is run on a 22 tooth gear, resulting in a 1.4 surface speed ratio with the RKA roll rotating faster than the raised ridge RKA roll.

The deformed webs produced by the processes in Examples 5-8 are shown in FIGS. 17-20, respectively.

Figure 17:
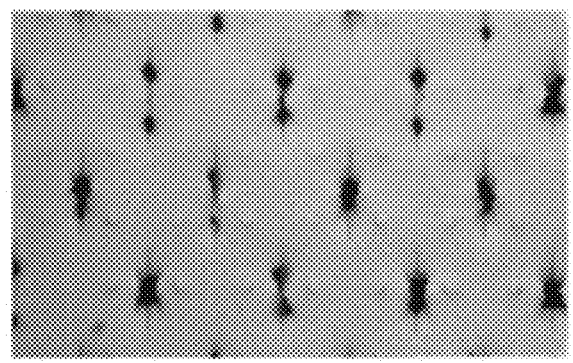
FIG. 17 is a photomicrograph of a comparative web that was mechanically deformed by intermeshing rolls operating at a matched speed.

FIG. 17 shows the comparative example material made by passing a film through the nip between two rolls moving at the same surface speed. As shown in FIG. 17, the apertures formed in the film are narrow and slit-like.

This can be contrasted with the deformed web 20 formed by passing such a film through two rolls moving at different surface speeds according to the present invention. This latter film 20 is shown in FIG. 18. As shown in FIG. 18, the apertures 24 formed in the web are significantly longer and wider in comparison to the web shown in FIG. 15, again providing the benefits of increased fluid acquisition for absorbent structures and improved visibility of the apertures. FIG. 18 also shows how the differential speed process "plows" the material so it accumulates and is piled up such as at 26 at one end of the apertures. The protrusions created by the raised ridge RKA roll are also visible on the top side of the web. Although most of the "plowing" occurs around the RKA teeth on the first roll, the web is also "plowed" by the raised ridge RKA teeth on the second roll, but in the opposite direction of the apertures formed by the RKA teeth on the first roll.

Figure 19:
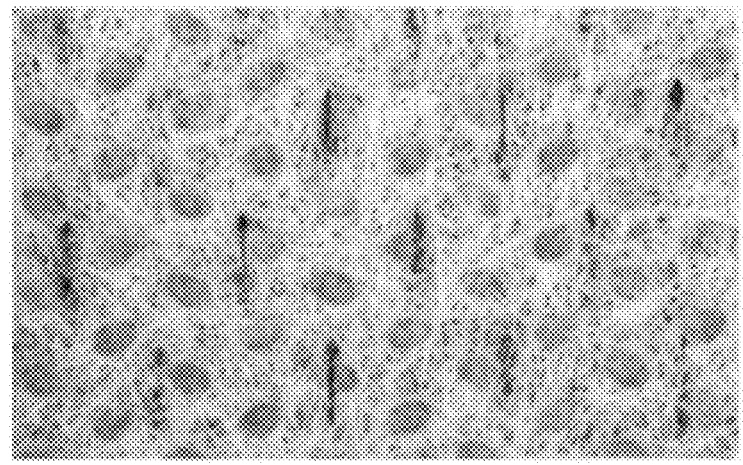
FIG. 19 is a photomicrograph of a comparative web that was mechanically deformed by intermeshing rolls operating at a matched speed.

FIG. 19 shows the comparative example material made by passing a nonwoven through the nip between two rolls moving at the same surface speed. As shown in FIG. 19, the web comprises narrow, slit-like apertures elongated in the machine direction.

Figure 20:
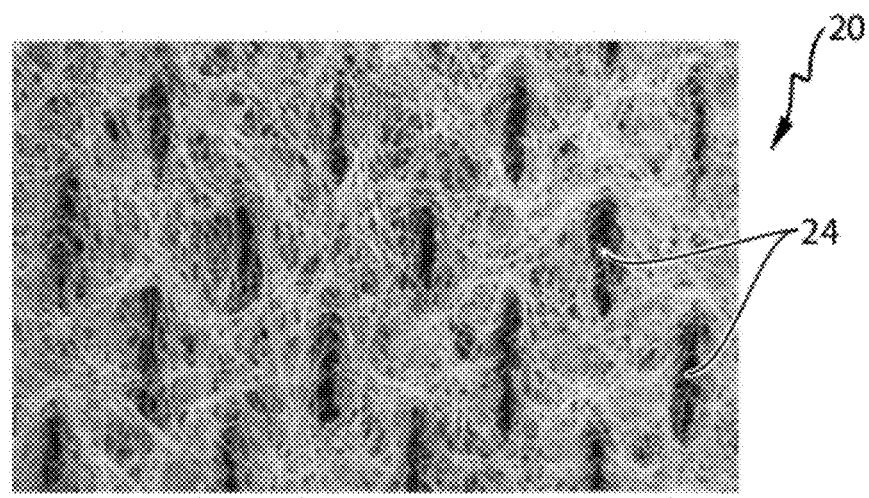
FIG. 20 is a photomicrograph of a comparative web to that shown in FIG. 19 that was mechanically deformed by intermeshing rolls operating at a speed differential.

This can be contrasted with the deformed nonwoven web 20 shown in FIG. 20, which was formed by passing such a nonwoven through two rolls moving at different surface speeds according to the present invention. As shown in FIG. 20, the web 20 processed with rolls having different surface speeds has both longer and wider apertures 24, making them more visible and functional.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 grams" is intended to mean "about 40 grams".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for mechanically deforming a web of material, said method comprising:
    a) providing a precursor web material having a first surface and a second surface, said first surface and second surfaces each defining planes;
    b) providing a pair of forming members comprising rolls forming a nip therebetween, said forming members comprising:
        a first roll having a machine direction orientation, a diameter, and a surface comprising a plurality of first forming elements comprising discrete male forming elements in the form of teeth, wherein the first roll has a machine direction tooth repeat length, and said first roll moves at a first surface speed; and
        a second roll having a machine direction orientation, a diameter, and a surface comprising a plurality of second forming elements comprising discrete male forming elements in the form of teeth, wherein the second roll has a machine direction tooth repeat length, and said second roll moves at a second surface speed,
        wherein the rolls are arranged so that the first forming elements and the second forming elements intermesh in said nip, wherein the first and second roll diameters are the same, and the rolls are rotated at a different number of revolutions per minute so that the rolls are moving at different surface speeds, wherein one of said first roll and second roll moves at a slower surface speed than the other, and the surface speed ratio of the faster roll to the slower roll is greater than about 1.01, and the machine direction tooth repeat length on at least one roll is set so that the ratio of the rpm of the first roll to the second roll is equal to the ratio of the machine direction tooth repeat length of the first roll to the second roll; and
    c) mechanically deforming said precursor web material by passing said precursor web material in the machine direction through the nip between said first and second rolls to form a consistent, repeating pattern of deformations on said precursor web.

2. A method for mechanically deforming a web of material, said method comprising:
    a) providing a precursor web material having a first surface and a second surface, said first surface and second surfaces each defining planes;
    b) providing a pair of forming members comprising rolls forming a nip therebetween, said forming members comprising:
        a first roll having a machine direction orientation, a diameter, and a surface comprising a plurality of first forming elements comprising discrete male forming elements in the form of teeth, wherein the first roll has a machine direction tooth repeat length, and said first roll moves at a first surface speed; and
        a second roll having a machine direction orientation, a diameter, and a surface comprising a plurality of second forming elements comprising discrete male forming elements in the form of teeth, wherein the second roll has a machine direction tooth repeat length, and said second roll moves at a second surface speed,
        wherein the rolls are arranged so that the first forming elements and the second forming elements intermesh in said nip, wherein the first and second rolls have different diameters, and the rolls are rotated at the same number of revolutions per minute, wherein the rolls are moving at different surface speeds, wherein one of said first roll and second roll moves at a slower surface speed than the other, and the surface speed ratio of the faster roll to the slower roll is greater than about 1.01, and the roll diameter and machine direction tooth repeat length of the first and second rolls is established so that the ratio of the diameter of the first roll to the second roll is equal to the ratio of the machine direction tooth repeat length of the first roll to the second roll; and
    c) mechanically deforming said precursor web material by passing said precursor web material in the machine direction through the nip between said first and second rolls to form a consistent, repeating pattern of deformations on said precursor web.

\* \* \* \* \*